Jan. 19, 1926. 1,570,048
E. H. DICKENSHEET
VEHICLE TIRE
Filed August 25, 1920 3 Sheets-Sheet 1

INVENTOR.
E.H.Dickensheet.
BY Chas. E. Townsend.
ATTORNEY.

Jan. 19, 1926. 1,570,048
E. H. DICKENSHEET
VEHICLE TIRE
Filed August 25, 1920 3 Sheets-Sheet 2
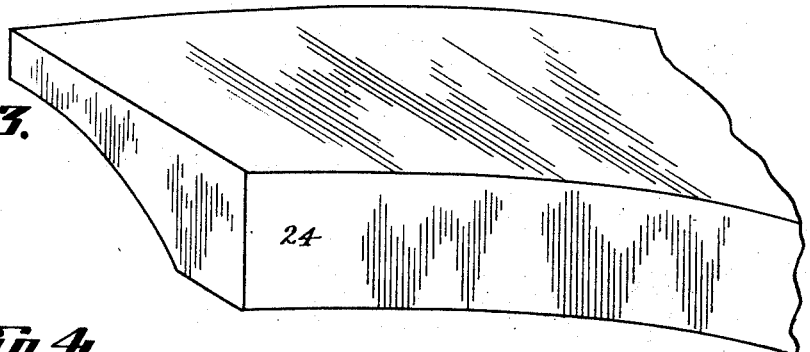
Fig.3.
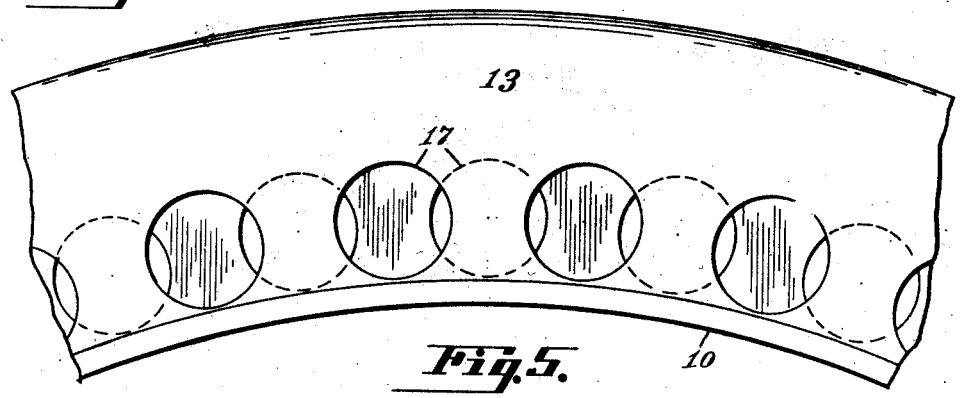
Fig.4.
Fig.5.
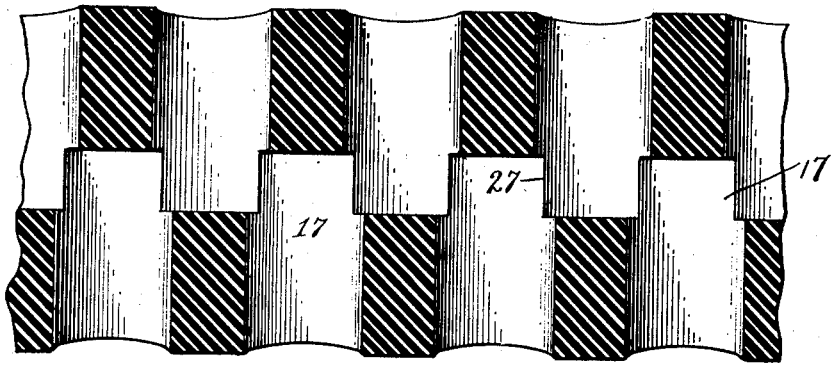
Fig.6.
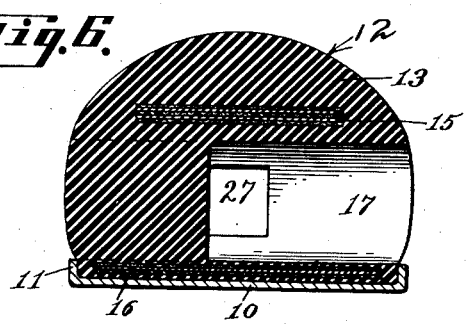
INVENTOR.
E.H.Dickensheet.
BY Chas. E. Journay
ATTORNEY

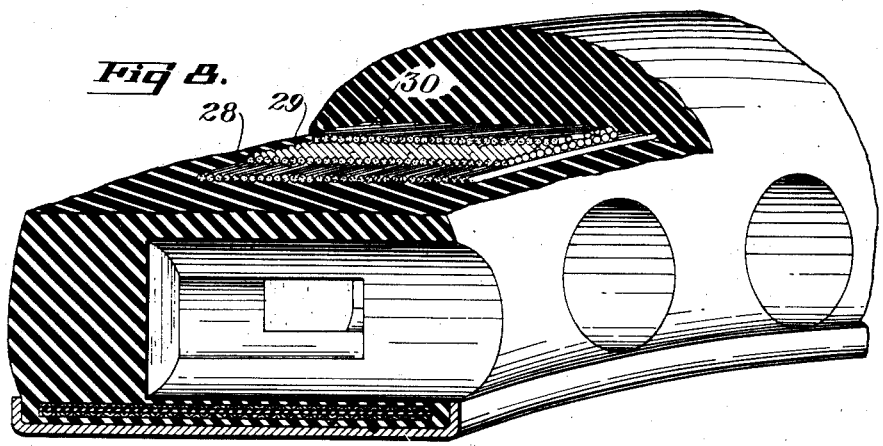
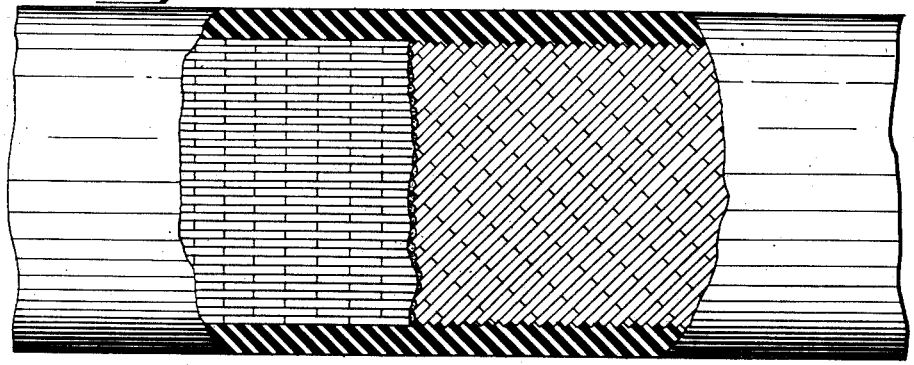
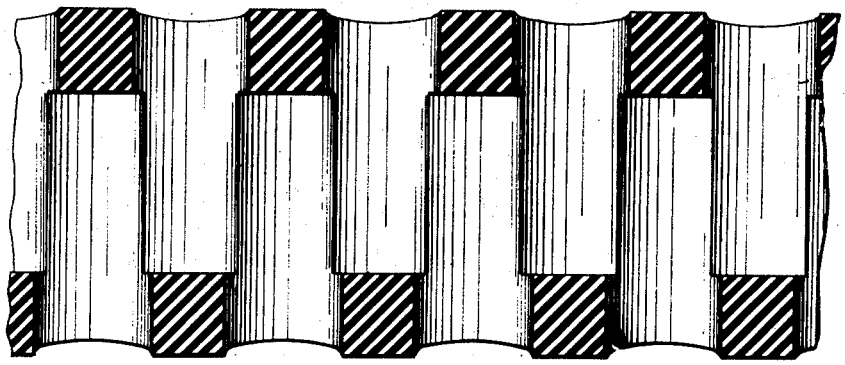

Patented Jan. 19, 1926.

1,570,048

UNITED STATES PATENT OFFICE.

EARLE HENRY DICKENSHEET, OF KANSAS CITY, MISSOURI, ASSIGNOR TO FAULTLESS PNEUMATIC TIRE COMPANY, OF SEATTLE, WASHINGTON, A CORPORATION OF WASHINGTON.

VEHICLE TIRE.

Application filed August 25, 1920. Serial No. 405,828.

*To all whom it may concern:*

Be it known that EARLE H. DICKENSHEET, citizen of the United States, residing at Kansas City, in the county of Jackson and State of Missouri, has invented a new and useful Improvement in Vehicle Tires, of which the following is a specification.

This invention relates to vehicle tires of the cushion type.

It is the principal object of the present invention to provide a tire embodying all of the desirable qualities of a pneumatic tire in which the compressed air tube is eliminated and desired air action obtained by the peculiar arrangement of air passageways extending transversely and circumferentially of the tire and within which air is present at atmospheric pressure, said tire being designed to insure a maximum, and at the same time to permit a free air circulation for ventilating the tire throughout its circumference.

The present invention contemplates the construction of a cushion tire formed with a plurality of intercommunicating lateral openings.

The invention is illustrated by way of example in the accompanying drawings, in which—

Fig. 3 is a fragmentary view in perspective illustrating one of the removable mold sections.

Fig. 4 is a fragmentary view in side elevation illustrating the formation of the lateral passageways through the tire.

Fig. 5 is a fragmentary view taken circumferentially of the lateral passageways of the tire showing the manner in which they intercommunicate.

Fig. 6 is a view in transverse section through the tire as constructed.

Fig. 8 is a fragmentary view in perspective illustrating one manner in which the tire structure may be reinforced.

Fig. 9 is a fragmentary view in section and elevation disclosing the arrangement of the reinforcing fabric in the tire.

Fig. 10 is a view in section taken circumferentially of the tire and showing a construction in which a variation in resiliency is made as compared with the structure disclosed in Fig. 5.

Figure 1:
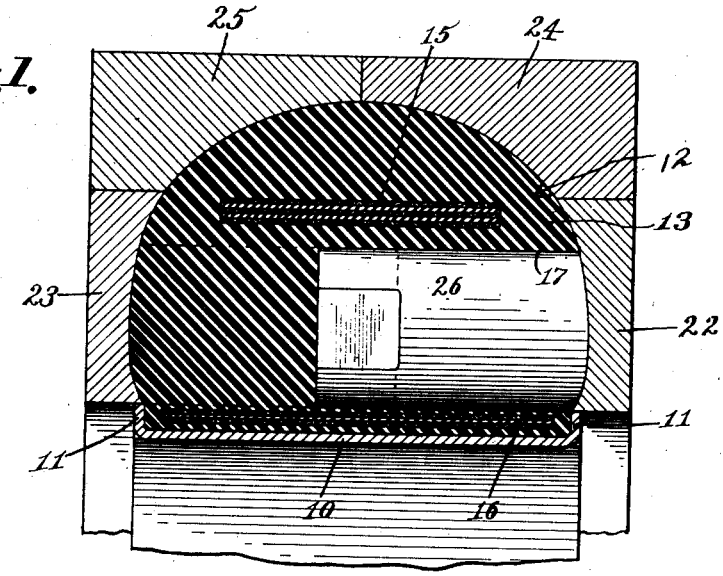
Figure 1 is a view in transverse section through the tire, with which the present invention is concerned, and its mold.
Figure 2:
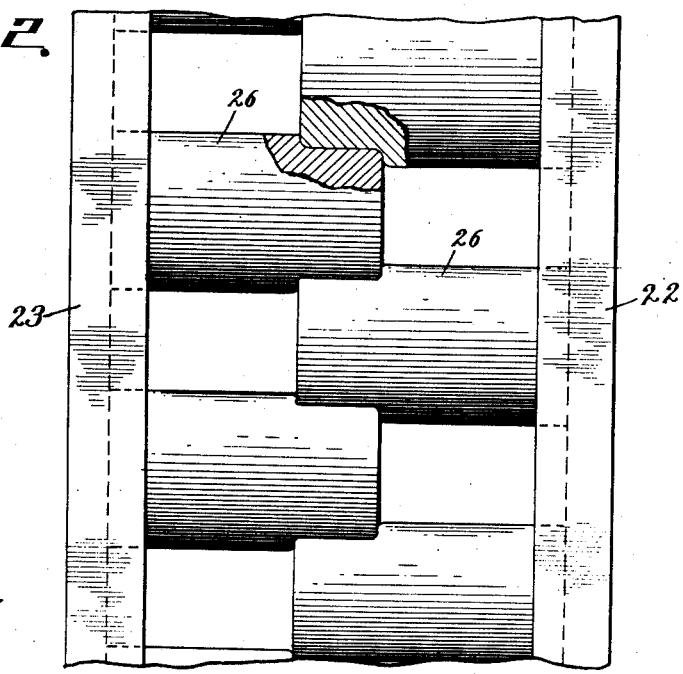
Fig. 2 is a view through the tire and mold as taken circumferentially thereof showing the overlapping arrangement of the core studs.

Referring more particularly to the drawings: 10 indicates an annular rim having outturned side flanges 11 along its opposite and marginal edges. This rim thus forms a circumferential channel around and within which the tire 12 is formed. This tire, broadly considered, comprises a body portion 13, formed of rubber, having a breaker strip 15 embedded within the tread section thereof, a bed strip 16 embedded within the base thereof and being otherwise constructed with lateral staggered passageways 17, which occur between the breaker strip and the bed strip. These passageways, as before stated, are staggered in relation to each other and extend inwardly from opposite sides of the tire. The passageways also overlap each other along the circumferential center of the tire, thus permitting a free ventilation throughout all the passageways and center of the tire and thereby maintaining the temperature of the tire body at a minimum. The tire thus formed is preferably provided with nuts 18 which receive bolts 19 by which the rim 10 may be secured in place around the felly of the usual vehicle wheel. In order to make the present construction universal in its application and to permit the tire to be placed over the usual clincher rim 20, a filler member 21 of channel or other section is placed around the rim 20 and between the side flanges thereof to build up a supporting structure, upon which the tire rim 10 may be firmly and securely held by the bolts 19.

Figure 7:
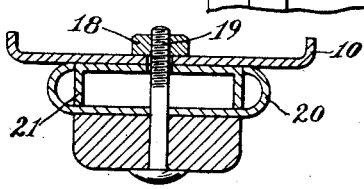
Fig. 7 is a fragmentary view in section showing the manner of mounting the tire upon a wheel rim of common design.

In forming the tire, as previously described, a four-part mold is used comprising side sections 22 and 23 and tread sections 24 and 25. These sections are combined to form a composite mold having an annular cavity agreeing with the outer contour of the tire to be formed. The side sections cooperate with the tire rim 10 to complete an enclosed cavity agreeing with the section of the tire. The side section 22 carries laterally extending cylindrical cores 26 which are formed with flattened side faces adapted to overlap similar faces on cores 26 extending inwardly from the opposite side section 23 of the mold. Although the cores are here shown as cylindrical it is obvious that they may be of any other suitable shape. It will thus be understood that a plurality of core members 26 are mounted upon each of the side sections 22 and 23, and that they extend toward each other, and for a length alongside each other to form a plurality of intercommunicating passageways 17. Due to the arrangement of the cores in alternate staggered relation to each other and the close fit which exists between the overlapping ends thereof, a void portion 27 will occur between the ends of the passageways 17 and will thus form a series of circumferentially communicating passageways between the various lateral cavities 17. The tread members of the mold, as indicated at 24 and 25, may be designed to produce any character of tread required and may be easily removed irrespective of the irregularities in the surface thereof. After the tire has been formed and cured, the tread sections 24 and 25 are removed from the tire and the side sections 22 and 23 of the mold are then drawn outwardly to withdraw the cores 26. This will leave the tire completely exposed and permanently formed upon the tire band 10. The completed tire may then be mounted upon the usual clincher tire rim in the manner and by the means shown in Fig. 7.

I prefer to form a breaker strip 15 of a plurality of layers of cord fabric, that is to say, a fabric having warp cords laid side by side and all running in the same direction. The cords are tied together transversely by woof threads and the layers of fabric are coated with rubber or other agglutinant on both sides. As shown in Figs. 8 and 9, I employ a bottom layer of fabric 28 in which the cords all run circumferentially around the tire; an intermediate layer 29 in which the fabric is cut with the warp cords at an angle to the length of the material, and a top layer 30 also cut with its warp cords running substantially at an angle to the cords in the layer 29.

In this way the circumferential passageway 27 is bridged and the tire is braced against side strains and stresses. In laying the fabric in place the cords are stretched somewhat, and being embedded in the rubber will be held taut. By varying the length of the mold blocks or pins 26, the resilience of the tire can be varied. In Fig. 5 I show the passageways 17 shorter than those illustrated in Fig. 10. The width of the circumferential passageway 27 will therefore be correspondingly decreased, and as a result thereof the tire in the case of Fig. 5 will be less resilient than that shown in Fig. 10, but will have greater strength and load carrying capacity.

In the operation of the tire the tread portion will be deflected against the resistance of the arch-like walls of the transverse passageways and the air within the transverse and circumferential pasageways will insure a desirable resilient action. These passageways will also permit a free circulation of air throughout the tire and thereby prevent heating of the rubber.

Various changes in the construction and operation of the several parts of my device may be employed without departing from the spirit of the invention as disclosed in the appended claims.

Having thus described my invention, what I claim and desire to secure by Letters Patent is—

1. A tire comprising a body portion formed of a resilient material, a permanent tire band upon which the tire is formed, a fabric base strip embedded within the body of the tire and disposed adjacent the tire band, a fabric breaker strip embedded within the tire and disposed adjacent the tread thereof, and a plurality of laterally extending alternately disposed passageways formed partially through the tire and said passageways having their inner ends overlapping and coinciding to permit intercommunication between the passageways and throughout the circumference of the tire.

2. A vehicle tire comprising a solid annular body, a plurality of lateral passageways alternately extending from the opposite sides of the tire and overlapping, to communicate at their inner ends, and laminated fabric reinforcing members embedded within the tire and extending circumferentially thereof, to bridge the overlapping ends of the cavities.

3. A tire comprising a substantially solid body portion, a plurality of lateral passageways alternately extending from the opposite sides of the tire in staggered relation and in a position to cause their inner ends to intersect and laterally overlap so as to communicate at their inner ends, and a layer of fabric embedded in the body portion and adapted to bridge the overlapping ends of the passageways.

In testimony whereof I have hereunto set my hand.

EARLE HENRY DICKENSHEET.